United States Patent [19]

Speller

[11] Patent Number: 5,752,381
[45] Date of Patent: May 19, 1998

[54] METHOD AND APPARATUS FOR VECTORING THRUST EMPLOYING ELECTRODES GENERATING VOLTAGES GREATER THAN THE DIELECTRIC BREAKDOWN VOLTAGE

[76] Inventor: Kevin E. Speller, 15902 Stonehaven, Houston, Tex. 77059

[21] Appl. No.: 521,339

[22] Filed: Aug. 29, 1995

[51] Int. Cl.$^6$ .................... F02K 1/00; F02K 9/80
[52] U.S. Cl. .................... 60/228; 60/230; 239/265.19
[58] Field of Search .................... 60/228, 229, 230, 60/202, 200.1; 239/265.19, 265.23

[56] References Cited

U.S. PATENT DOCUMENTS

| | | | |
|---|---|---|---|
| 2,763,125 | 9/1956 | Kadosch et al. | 60/35.54 |
| 3,071,154 | 1/1963 | Cargill et al. | 60/230 |
| 3,106,058 | 10/1963 | Rice | 60/202 |
| 3,143,851 | 8/1964 | Nyman | 60/202 |
| 3,145,531 | 8/1964 | Deutsch | 60/35.54 |
| 3,371,491 | 3/1968 | Pinter | 60/230 |
| 3,535,880 | 10/1970 | Work et al. | 60/202 |
| 3,552,125 | 1/1971 | Banks et al. | 60/230 |
| 3,754,397 | 8/1973 | Kidd et al. | 60/230 |
| 3,795,833 | 3/1974 | King et al. | 60/230 |
| 4,450,361 | 5/1984 | Holt | 310/11 |
| 4,663,932 | 5/1987 | Cox | 60/202 |
| 4,850,188 | 7/1989 | Testone | 60/202 |
| 5,090,482 | 2/1992 | Baron et al. | 169/46 |
| 5,211,006 | 5/1993 | Sohnly | 60/202 |

FOREIGN PATENT DOCUMENTS

| 294778 | 12/1987 | Japan | 60/202 |
|---|---|---|---|
| 2056927 | 3/1981 | United Kingdom | 60/228 |

OTHER PUBLICATIONS

"Missile Anxiety," Popular Science Magazine, Aug. 1995, p. 47.

"Electrical Aspects of Combustion" by James Lawton and Felix Weinberg, Department of Chemical.

*Primary Examiner*—Timothy Thorpe
*Assistant Examiner*—Ted Kim
*Attorney, Agent, or Firm*—Fulbright & Jaworski L.L.P.

[57] ABSTRACT

A method and apparatus are provided for controlling rocket and/or jet engine thrust by producing a strong electric, magnetic or electro-magnetic field, and applying the field to deflect the thrust stream as it exits from the engine until the desired thrust vector is obtained. The method of modifying an exhaust plume produced by combustion of fuel and ejected from an exhaust nozzle of a vehicle comprises the steps of: generating a field and producing a flow of electrons across the stream of the exhaust plume for interacting with charged ions and particles in the exhaust plume to deflect the direction of the exhaust plume, and controlling the magnitude and extent of deflection to steer the vehicle to a desired course. The apparatus comprises a high voltage generator and a plurality of electrode pairs located near the exit of the exhaust nozzle for generating a field and producing a flow of electrons across the stream of the exhaust plume for interacting with charged ions and particles in the exhaust plume to deflect the direction of the exhaust plume, and a control unit for controlling the magnitude and extent of deflection of the exhaust plume to steer the vehicle to a desired course.

9 Claims, 12 Drawing Sheets

METHOD AND APPARATUS FOR VECTORING THRUST EMPLOYING ELECTRODES GENERATING VOLTAGES GREATER THAN THE DIELECTRIC BREAKDOWN VOLTAGE

BACKGROUND OF THE INVENTION

1. Field of the Invention

The present invention relates to a method of and apparatus for vectoring engine exhaust thrust, and more particularly to directing or controlling rocket or jet engine thrust direction in order to steer a vehicle.

2. Description of the Related Technology

The existing methods and apparatus for vectoring rocket and jet thrust generally work by gimbaling a nozzle at the exit of the thrust from the engine, inserting a deflection plate into the thrust stream, or moving a vane located within the thrust stream. Another existing method for vectoring rocket thrust involves strategically firing multiple engines aimed in different directions. However, the existing methods and apparatus generally suffer in one or more of the following respects and drawbacks: many moving parts; complex mechanized systems; discontinuous control of thrust; heavy in weight; frequent maintenance requirements; limited reliability; and limited range of vector capability.

U.S. Pat. No. 5,090,482 teaches directing an intense electric field at the base of a fire for the purpose of extinguishing the fire, and does not contemplate directing an exhaust plume to control the direction of a vehicle in a precise and smooth manner.

U.S. Pat. No. 2,763,125 teaches application of an electric field across a stream of ionized gaseous fluid to control the direction of the stream and thereby the direction of a rocket. However, the '125 patent suffers several shortcomings. The exhaust flow is impeded by the positively charge electrode placed in the center of the exhaust stream, thereby decreasing the efficiency of the jet engine. Furthermore, the '125 patent requires deflector fins to further control the direction of exhaust flow and does not provide for a full 360 degree range of motion in the X-Y plane. In addition, the flat plane electrodes used to create the electric field are inefficient and create a significant amount of turbulence in the exhaust flow thereby affecting the efficiency of the exhaust flow.

The exhaust of rockets and jets used for thrust and a means of propulsion is composed primarily of charged particles. When charged particles are placed within an electric field, a force is exerted on the charged particles. The present invention uses this phenomenon to precisely control the direction of rocket and jet thrust by applying an exhaust charged-particle deflecting electric field to the exhaust of a rocket or jet. This method of controlling thrust requires no moving parts, less power, less weight, less maintenance, and provides a higher degree of accuracy, and greater range than conventional gimbaling systems.

SUMMARY OF THE INVENTION

An object of the present invention is to provide a novel method, and also a novel apparatus, for controlling rocket and jet thrust having improvements and advantages in one or more of the above described respects. The present invention provides a new and improved method for controlling rocket and jet thrust that is simpler and more refined than the prior art.

A further object is to provide such an improved method and apparatus utilizing a deflection field at the exhaust to vector the direction of the exhaust.

Thus in accomplishing the foregoing objects, there is provided in accordance with one aspect of the present invention an apparatus for modifying an exhaust plume produced by combustion of fuel and ejected from an exhaust nozzle of a vehicle to propel said vehicle comprising means for generating a field and a flow of electrons across the stream of the exhaust plume for interacting with charged ions and particles in the exhaust plume to deflect the direction of the exhaust plume; and means for controlling the magnitude and extent of deflection of said exhaust plume to steer the vehicle to a desired course. The means for generating the field and flow of electrons preferably comprises means for generating a first field and a first flow of electrons across the stream of the exhaust plume and means for generating at least a second field and a second flow of electrons across the stream of the exhaust plume from a position diametrically offset from the position of said first field and electron flow generating means. The second field and electron flow generating means may be preferably offset 90 degrees from the first field and electron flow generating means.

The means for generating a field and a flow of electrons may comprise three or more electrodes positioned on an inner surface of an electrode housing about the periphery of the exit of the exhaust nozzle. The electrode housing may be comprised of a plurality of electrically conductive arc-shaped segments, each segment carrying a single electrode. Each segment of the electrode housing is preferably electrically isolated from the adjacent segments by an insulator positioned therebetween. The electrodes each may comprise a needle-like object or a plurality of bundled pointed needle-like objects.

The field and electron flow generating means may further include a high voltage generator electrically connected to each of said electrodes. The apparatus may further include means for controlling comprising a direction control unit electrically connected to said high voltage generator. The direction control unit may regulate the selection of electrodes to which the voltage is applied, the amount of voltage applied, and the timing of the voltage application. An operator control may also be provided for determining an input to the direction control unit. The field may be of such a strength that a flow of charged electrons in produced. The field may preferably be either electric, magnetic, electromagnetic or any combination thereof.

According to another aspect of the invention, there is provided an apparatus for modifying an exhaust plume produced by combustion of fuel and ejected from an exhaust nozzle of a vehicle to propel said vehicle comprising means for generating a field across the stream of the exhaust plume for interacting with charged ions and particles in the exhaust plume to deflect the direction of the exhaust plume; and means for controlling the magnitude and extent of deflection of said exhaust plume to steer the vehicle to a desired course.

According to a further aspect of the invention, an apparatus is provided for modifying an exhaust plume produced by combustion of fuel and ejected from an exhaust nozzle of a vehicle to propel said vehicle comprising means for generating a flow of charged electrons across the stream of the exhaust plume for interacting with charged ions and particles in the exhaust plume to deflect the direction of the exhaust plume; and means for controlling the magnitude and extent of deflection of said exhaust plume to steer the vehicle to a desired course.

According to another aspect of the invention, provided is a method of modifying an exhaust plume produced by combustion of fuel and ejected from an exhaust nozzle of a vehicle to propel said vehicle comprising the steps of generating a field and a flow of electrons across the stream of the exhaust plume for interacting with charged ions and particles in the exhaust plume to deflect the direction of the exhaust plume; and controlling the magnitude and extent of deflection to steer the vehicle to a desired course. The steps of generating a field and a flow of charged electrons may further comprise generating a first field and a first flow of electrons across the stream of the exhaust plume; and generating a second field and a second flow of electrons across the stream of the exhaust plume from a position diametrically offset from the position from which said first field and said first flow of electrons are generated. The second field and second flow of electrons may be generated from a position offset 90 degrees from the position from which said first field and said first flow of electrons are generated. Both first and second fields and first and second flows of electrons may be generated by applying a high voltage between opposing pairs of electrodes positioned at the exit of the exhaust nozzle. The high voltage may be produced by a direct current, or alternatively by either nonsinusoidal wave forms, alternating current, frequency-modulated alternating current, phase-modulated alternating current, amplitude-modulated alternating current, waves of multiple frequencies superimposed on one another or any combination thereof.

A further aspect of the invention is a method of modifying an exhaust plume produced by combustion of fuel and ejected from an exhaust nozzle of a vehicle to propel said vehicle comprising the steps of: generating at least a first and a second field across the stream of the exhaust plume for interacting with charged ions and particles in the exhaust plume to deflect the direction of the exhaust plume, the second field being generated from a position diametrically offset from the position from which the first field is generated; and controlling the magnitude and extent of deflection to steer the vehicle to a desired course.

Still another aspect of the invention is a method of modifying an exhaust plume produced by combustion of fuel and ejected from an exhaust nozzle of a vehicle to propel said vehicle comprising the steps of: producing a flow of electrons across the stream of the exhaust plume for interacting with charged ions and particles in the exhaust plume to deflect the direction of the exhaust plume; and controlling the magnitude and extent of deflection to steer the vehicle to a desired course.

Other and further objects, features and advantages will be apparent and eventually more readily understood from a reading of the following specification and accompanying drawings, wherein examples of the presently preferred embodiments of the invention are given for the purpose of disclosure.

DESCRIPTION OF PREFERRED EMBODIMENTS

The term "vehicle" as used in the present invention includes, but is not limited to, missiles, rockets, spacecraft, jet airplanes, satellites and other air and space borne objects. Liquid fuel and solid rocket fuel engines and jet engines are included herein.

The term "field" as used herein shall include, but not be limited to electric fields, magnetic fields, electromagnetic fields and combinations thereof.

Figure 1:
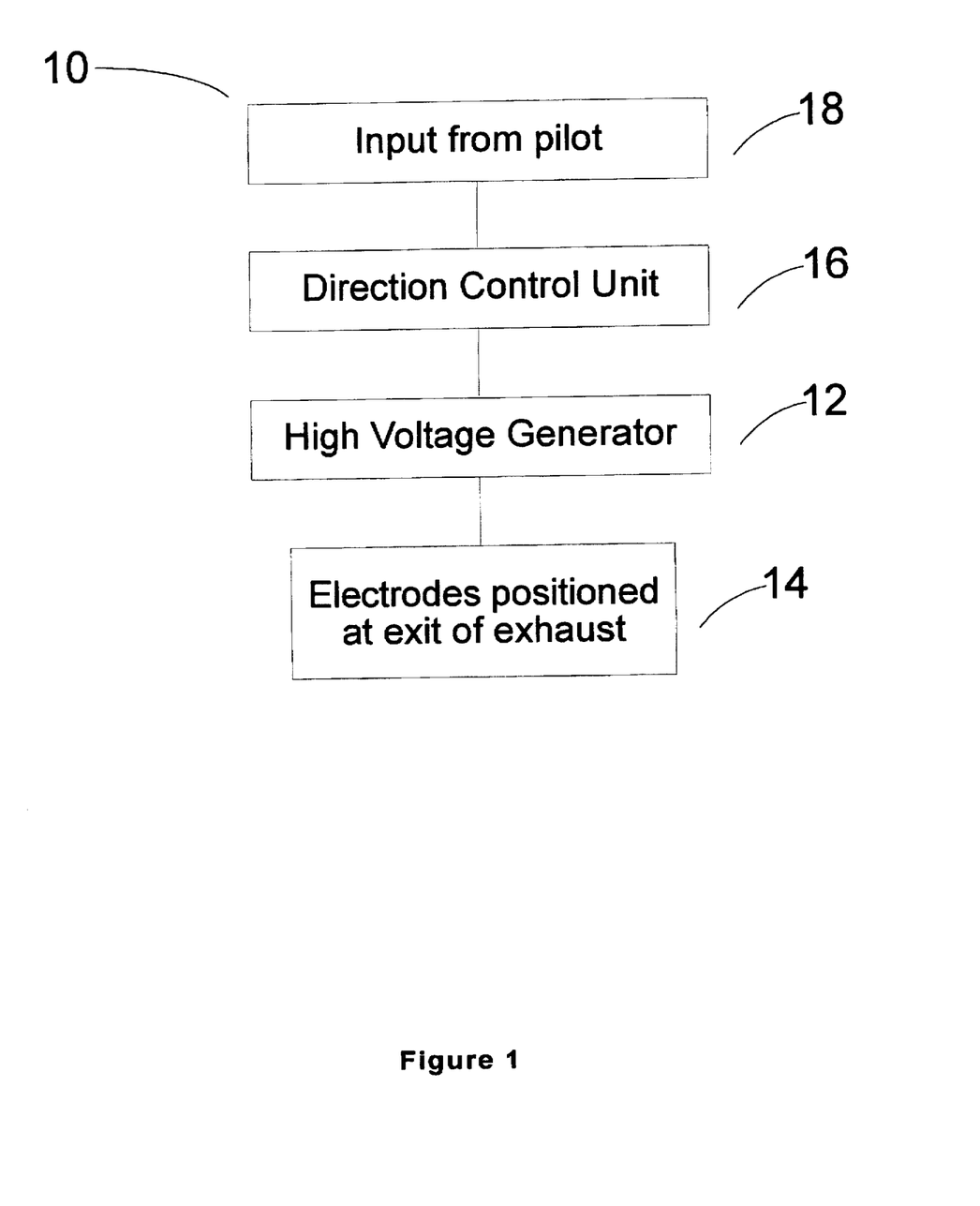
FIG. 1 is a diagrammatic representation of an apparatus for modifying an exhaust plume according to an embodiment of the invention.

As shown in FIG. 1, an apparatus for vectoring exhaust thrust 10 according to one embodiment of the present invention generally comprises a high voltage generator 12 for generating a field and/or a flow of charged electrons for interacting with charged ions and particles in the exhaust plume; a plurality of electrodes 14 positioned near the exit of the exhaust nozzle for generating the field and/or flow of electrons across the stream of the exhaust plume to deflect the direction of the exhaust plume; and a direction control unit 16 for controlling the magnitude and extent of deflection of said exhaust plume to steer the vehicle to a desired course. The apparatus may further comprise an input 18 from a person desiring to steer said vehicle, hereinafter referred to as the pilot, which is received by the direction control unit 16. The direction control unit 16 produces an output signal in response to the pilot input 18. The output from the direction control unit 16 is then fed to a high voltage generator 12. The direction control unit 16 regulates the amount of and timing of voltage that the high voltage generator 12 delivers to the plurality of electrodes 14 positioned at the exhaust nozzle 20 where the exhaust exits the vehicle. The direction control unit 16 also determines to which electrodes at the exit of said exhaust nozzle 20 a potential from the high voltage generator 12 is applied, and thus the degree of deflection or asymmetry produced to obtain the resulting thrust vector and subsequent direction of the vehicle.

Figure 2:
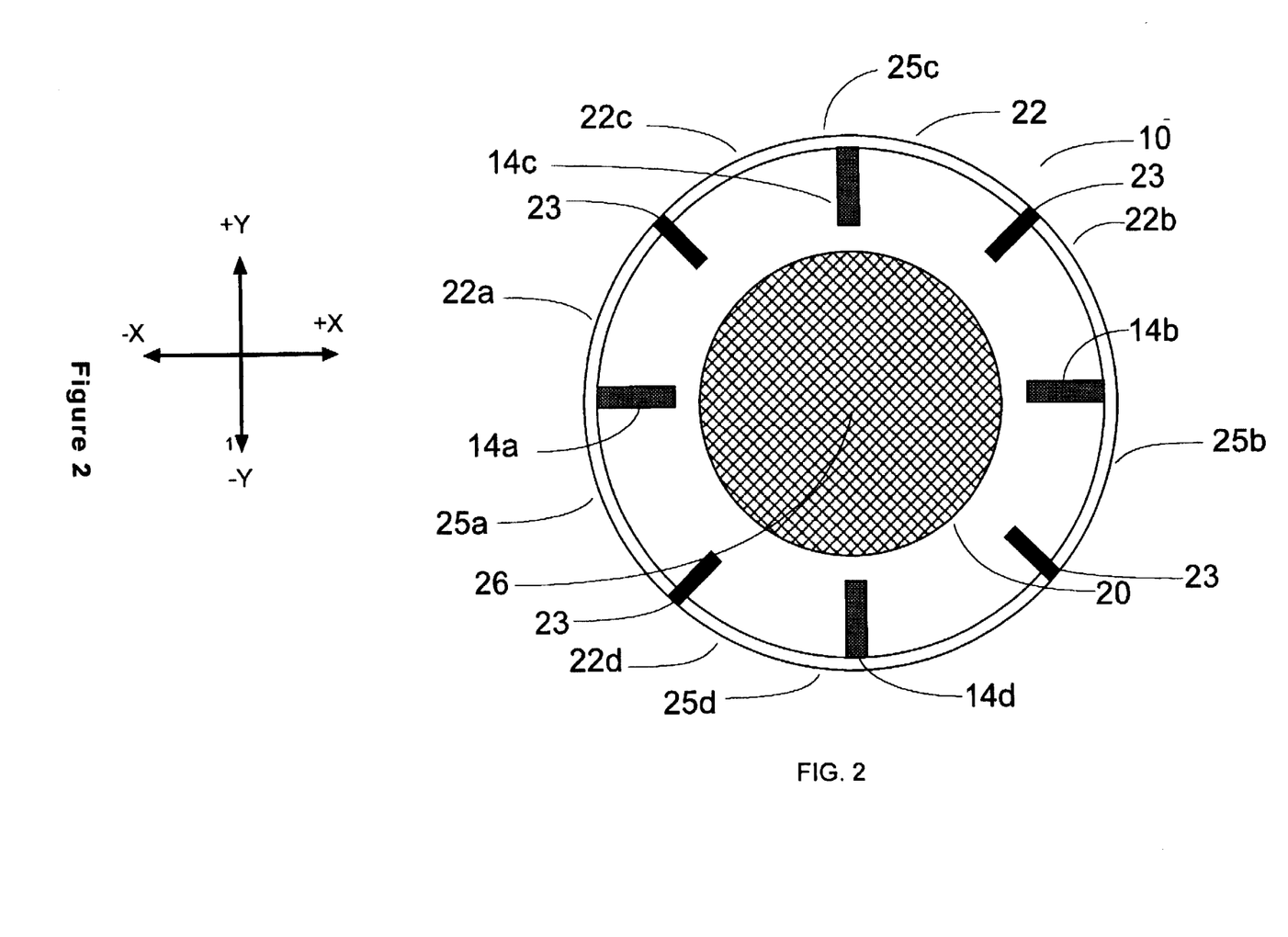
FIG. 2 is an end view of the apparatus for modifying an exhaust plume according to one embodiment of the invention.
Figure 3:
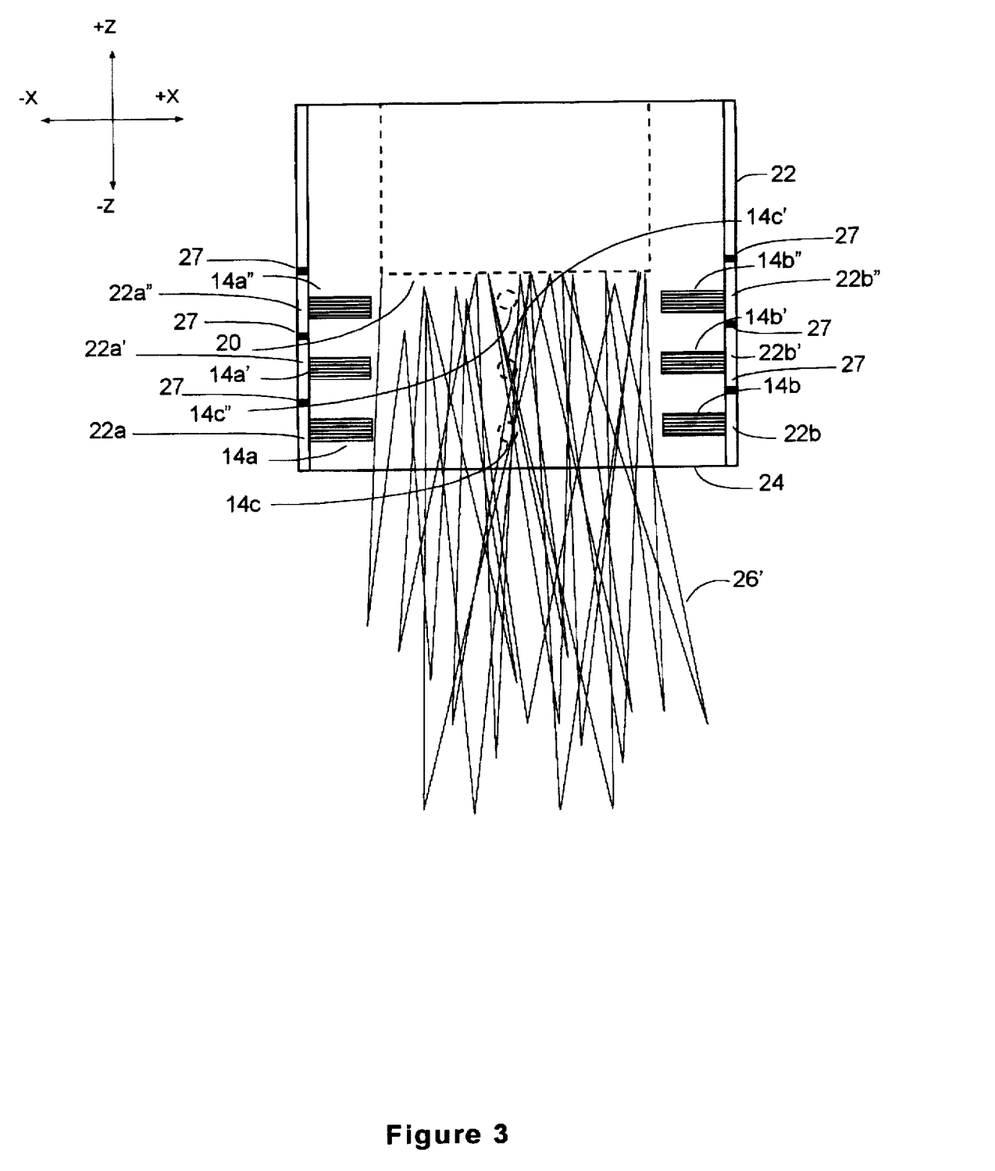
FIG. 3 is a side view of the apparatus shown in FIG. 2.
Figure 4:
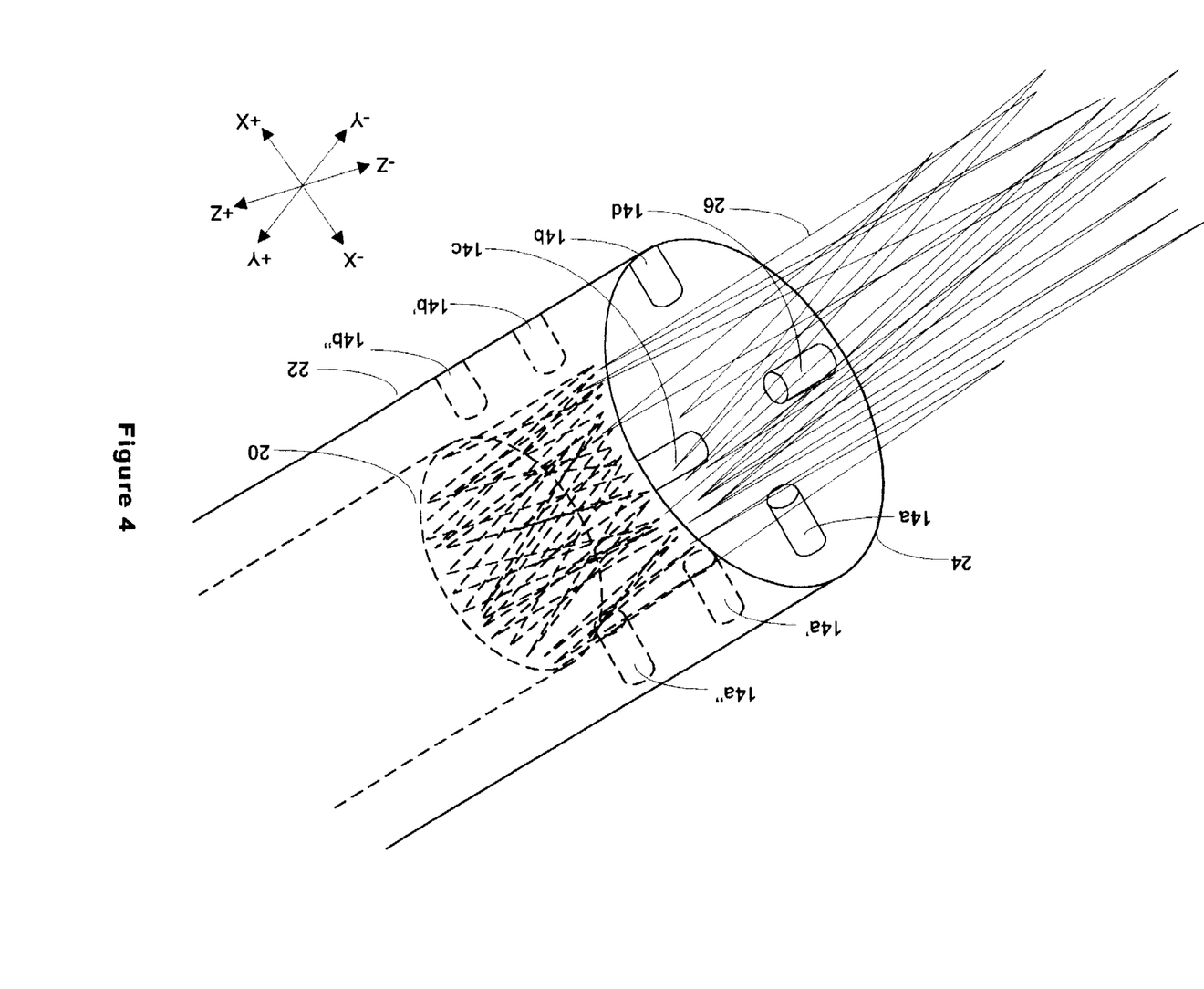
FIG. 4 is a perspective view of the apparatus shown in FIGS. 2 & 3.

FIGS. 2-4 show an apparatus for vectoring thrust 10 according to a presently preferred embodiment. An electrode housing 22 is provided to house the plurality of electrodes 14 and surrounds the exhaust nozzle 20 and extends beyond the exit thereof. The electrodes 14 are positioned within the electrode housing 22 near the exit of the exhaust nozzle 20 to modify the direction of the exhaust plume 26 as it exits past the lower rim 24 of the electrode housing 22. This allows an electric field to be set up to apply a force to the exiting rocket thrust in the −X, X, −Y, and Y directions, as shown in FIG. 2. By combining the proper X and Y vectors, the direction control unit 16 can precisely vector the thrust of the vehicle 360 degrees in the X-Y plane.

According to one preferred embodiment, the electrode housing is formed of an electrically conductive material and is divided into a plurality of arc-shaped segments 22a, 22b, 22c, 22d. Each arc shaped segment is electrically insulated from adjacent segments by an insulator 23. Each of electrodes 14a, 14b, 14c, 14d is physically and electrically connected to an inner surface of each corresponding arc-shaped segment 22a, 22b, 22c, 22d to form a plurality of electrode assemblies 25a, 25b, 25c, 25d, respectively. Each electrode assembly functions independently from the other electrode assemblies. According to an alternative embodiment, the electrode housing 22 is a solid-walled cylinder formed of a non-conductive material. In this embodiment, an electrode assembly would comprise only the electrodes 14 attached to the inner surface of the non-conductive housing 22.

A first pair of opposing electrode assemblies 25a, 25b, comprising electrodes 14a, 14b attached to the inner walls of the respective electrode housing segments 22a, 22b, are positioned between the exit of the exhaust nozzle 20 and the lower rim 24 of the electrode housing and are aimed at the exhaust plume 26. A high voltage is generated by said high voltage generator and applied across electrode assemblies 25a, 25b to generate a field and/or a flow of electrons across the stream of the exhaust plume 26. The field and/or flow of electrons interact with charged ions and particles in the exhaust plume 26 causing deflection thereof. Electrode assembly 25a is positioned at the exit of the exhaust nozzle 20 diametrically opposite electrode assembly 25b.

According to a preferred embodiment of the invention, a second pair of diametrically opposing electrode assemblies 25c, 25d, comprising electrodes 14c, 14d attached to the inner walls of respective electrode housing segments 22c, 22d, are positioned between the exit of the exhaust nozzle 20 and the lower rim 24 of the electrode housing and are aimed at the exhaust plume 26. A high voltage is generated by the high voltage generator 12 and applied across the electrode assemblies 25c, 25d to generate a second field and/or a second flow of electrons across the stream of the exhaust plume 26. The field and/or flow of electrons interact with charged ions and particles in the exhaust plume 26 causing deflection thereof. The second pair of electrode assemblies 25c, 25d are diametrically offset, preferably 90 degrees, from said first pair of electrode assemblies 25a, 25b, and are insulated from the adjacent electrode assemblies by insulators 23. The insulators 23 extend inwardly past the inner wall of the electrode housing to prevent arcing between adjacent electrodes.

Further pairs of opposing electrode assemblies 25a', 25b', 25c', 25d', and 25a", 25b", 25c", 25d" comprising electrodes 14a', 14b', 14c', 14d' and 14a", 14b", 14c", 14d" mounted in corresponding electrode housing segments 22a', 22b', 22c', 22d' and 22a", 22b", 22c", 22d" substantially in axial alignment with the corresponding electrode assemblies 25a, 25b, 25c, 25d, respectively. The second group of electrode assemblies 25a', 25b', 25c', 25d' and the third group of electrode assemblies 25a", 25b", 25c", 25d" are each arranged in the same manner as the first group of electrode assemblies 25a, 25b, 25c, 25d as described above. In addition, an insulator 27 may be positioned between adjacent groups of electrode assemblies as shown in FIG. 3.

According to a preferred mode of operation, a high voltage potential from the high voltage generator 12 is applied across the first pair of electrode assemblies 25a, 25b and the second pair of electrode assemblies 25c, 25d. Where additional electrode assemblies 25a', 25b', 25c', 25d' and 25a", 25b", 25c", 25d" are present, the high voltage potential is applied accordingly. The magnitude and timing of the voltage applied to each said electrode assembly is determined by the direction control unit 16, which is controlled by the pilot input 18. The exhaust 26 exiting from said vehicle for the purpose of producing thrust to propel the same, changes direction according to the magnitude of the voltage applied and the asymmetry of the field and/or flow of electrons applied across each said electrode assembly pair. By selecting the proper magnitude of the voltage applied across each said electrode assembly pair, the direction control unit 16 can vector the exiting thrust 26 any direction in the X-Y plane, as shown in FIG. 2. Moreover, the exiting thrust 26 can be deflectingly vectored to any precise angle and precise magnitude in the X-Y plane by the selective application of voltage to the each said electrode pairs. The voltage applied by the high voltage generator 12 to each electrode assembly 25a, 25b, 25c, 25d, 25a', 25b', 25c', 25d', 25a", 25b", 25c", 25d" is individually controlled by the direction control unit 16. The vector, consisting of a direction and magnitude, of the exiting exhaust 26 and the thrust produced by the same in the X-Y plane of FIG. 2 is precisely controlled by the selective application of voltage to the said electrode assemblies and controlling the desired asymmetry of an applied field and/or flow of electrons. With the exhaust 26 and the accompanying thrust produced by the same, unmodified by the invention, the vehicle will travel in a straight line, barring any influence from external forces, as shown in FIGS. 2–4.

Figure 5:
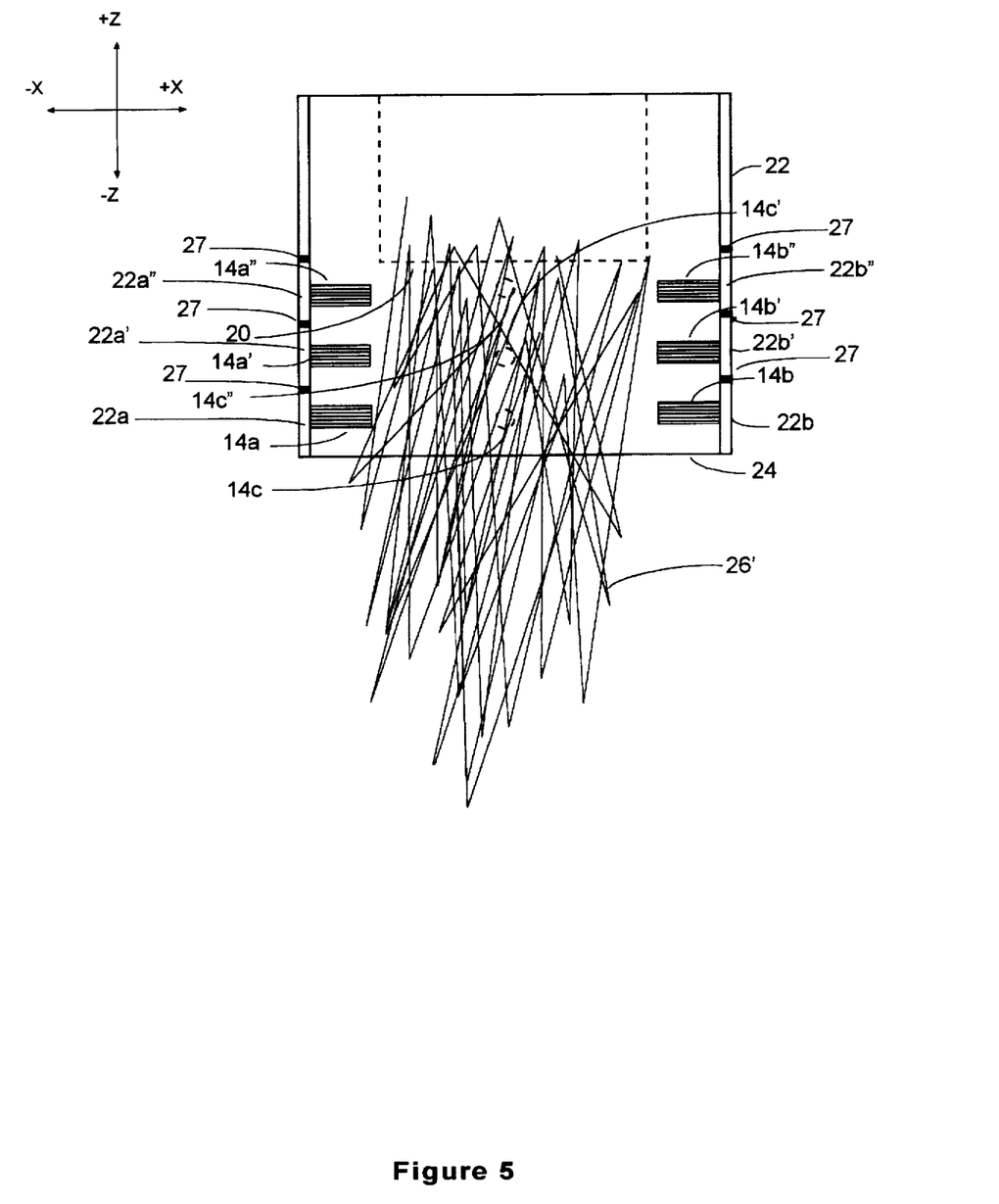
FIG. 5 is a side view of the apparatus shown in FIGS. 2-4, shown with the direction of the exhaust plume modified.
Figure 6:
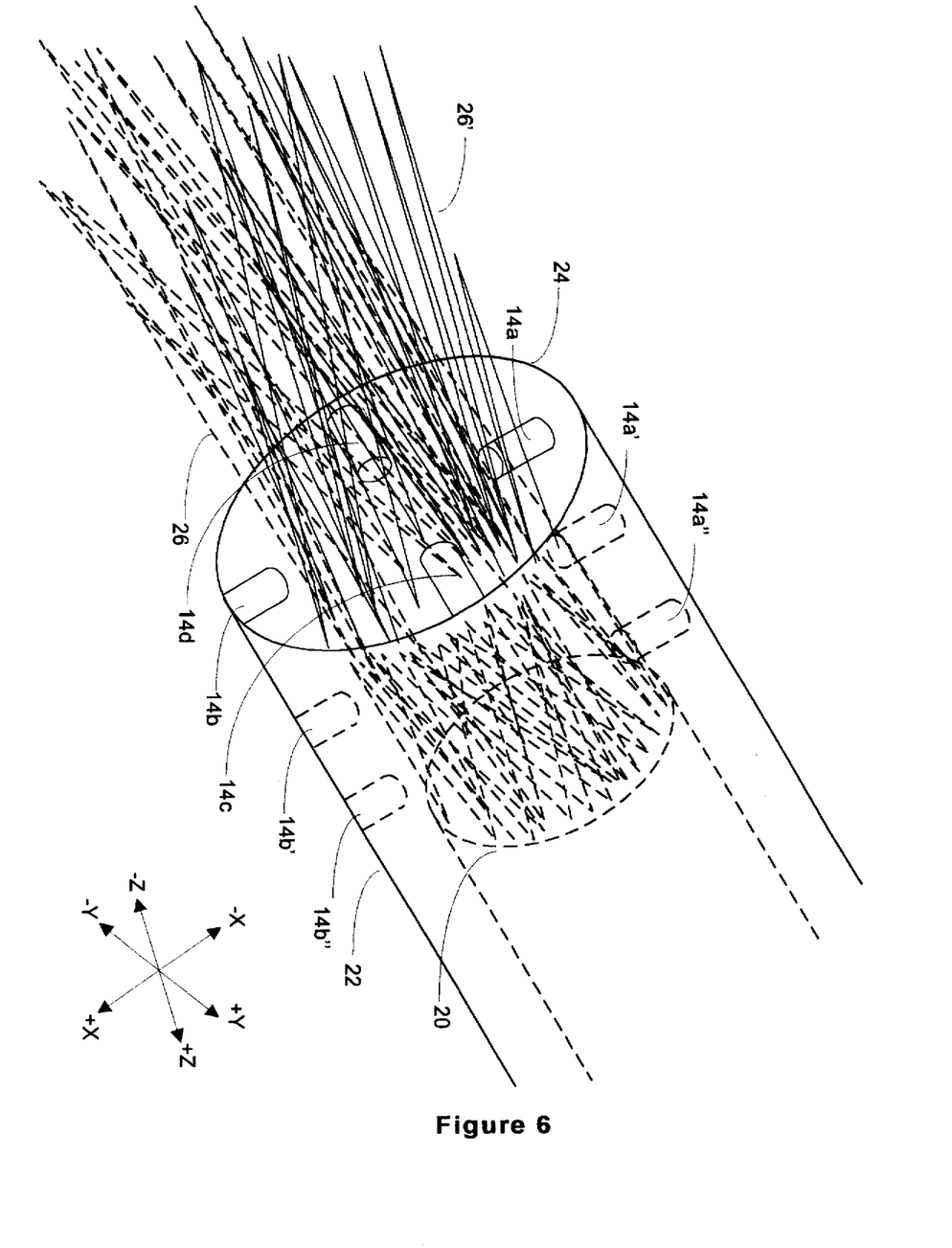
FIG. 6 is a perspective view of the apparatus shown in FIGS. 2-5, shown with the direction of the exhaust plume modified.

FIGS. 5–6 show the apparatus for vectoring thrust according to a presently preferred embodiment of the invention with the field and/or flow of electrons being applied across the exhaust plume 26 to produce a re-directed flow of exhaust thereof and change the direction of the vehicle. The field is preferably an electric field generated by the high voltage generator 12 producing a direct current (DC) field between opposing electrode assemblies. Alternatively, non-sinusoidal wave forms, alternating current (AC), frequency-modulated alternating current (FMAC), phase-modulated alternating current (PMAC), amplitude-modulated alternating current (AMAC), waves of multiple frequencies superimposed on one another or any combination thereof can be used.

According to an alternative embodiment, the field is a magnetic field generated by placing two magnetic poles of opposite polarity across the thrust stream. According to a further embodiment, said magnetic field is used in conjunction with an electric field and/or flow of electrons to control the thrust stream.

According to one preferred embodiment, the field generated is of such strength that a natural breakdown of the field occurs and a flow of electrons from one electrode to an opposing electrode is created across the flow of the exhaust plume. This natural breakdown occurs when the voltage applied across the electrodes is very high as compared to the dielectric strength of the air and exhaust stream between the electrodes. According to a preferred embodiment, the voltage differential between opposing electrode is between 15–40 kV. A voltage differential of approximately 30 kV provides an optimal condition where electron flow across the exhaust stream occurs while the field is substantially maintained.

As illustrated in FIGS. 5 & 6, the method of the present invention may be used to vector the exhaust plume 26 and the accompanying thrust produced by the same in the −X direction. Here, an input from the pilot 18 requesting that the thrust 26 be vectored in the −X direction is received by the direction control unit 16. The direction control unit 16 activates the high voltage generator 12 to apply a voltage, for example 30 kV, to the electrode assemblies 25b, 25b' and 25b". The opposing electrode assemblies 25a, 25a' and 25a" are maintained at a potential of 0 kV or ground. The asymmetrical voltage between said electrode assemblies produces an electric field and/or a flow of electrons which creates a deflected exhaust plume 26' and vectors the thrust in the −X direction. The degree of deflection in the −X direction will depend upon the voltage differential between electrode assemblies 25a and 25b. Where deflection in the +X direction is desired, a higher voltage may be applied to the electrode assembly 25a than to electrode assembly 25b.

When a change in the direction of the exiting exhaust 26 and the accompanying thrust produced by the same is desired in the −Y direction, the desired asymmetrical voltage is applied to electrode assemblies 25c, 25c' and 25c", with the opposing electrode assemblies 25d, 25d' and 25d" at a lower potential, such as ground. The degree of deflection is limited only by the physical structure of the vehicle and the electrode housing 22. Therefore, deflection from the Z axis ranges from zero to ninety degrees and deflection in the X-Y plane can occur in 360 degrees.

Through application of a high voltage across the proper combinations of electrode assembly pairs 25a and 25b, 25a' and 25b', 25a" and 25b", 25c and 25d, 25c' and 25d', and 25c" and 25d", the direction control unit 16 may direct or steer the exiting exhaust plume 26 and vector the thrust produced by the same in any direction in the X-Y plane, thereby providing an effective range of motion of 360 degrees in the X-Y plane. For example, application of 30 kV to each of electrode assemblies 25a and 25d with electrodes 25b and 25c at zero potential would result in a thrust vector bearing 45 degrees in the +X and 45 degrees in the −Y direction as shown in FIG. 2. Although the embodiments shown in the drawings include four electrodes 14a, 14b, 14c, 14d spaced about the periphery of the electrode housing 22, a 360 degree range of movement in the X-Y plane can be realized by using as few as three electrodes. The maximum number of electrodes is limited only by the physical size of the electrode housing.

To reduce the possibility of arcing between adjacent electrode assemblies, an insulator 23, made of a material with a high dielectric constant, is provided between each pair of adjacent electrode assemblies. The insulator 23 is positioned between adjacent arc-shaped electrode housing segments and extends inwardly beyond the inner wall of the electrode housing to prevent arcing between adjacent electrode assemblies. To further reduce the possibility of arcing between adjacent electrode assemblies, the potential can be applied between opposing electrode assembly pairs in quick sequential bursts, rather than applying voltage to multiple pairs of electrode assemblies simultaneously. For example, successive pulses can be quickly applied in an alternating manner between electrode assemblies 25a and 25b, then between electrode assemblies 25d and 25c. The quick successive alternating application of voltage to each of these electrode assemblies reduces the possibility of arcing between adjacent electrode assemblies and still provides the vehicle with a smooth directional change.

According to one preferred embodiment of the method of the present invention, a modification in the directional flow of the exhaust plume 26 is accomplished by generating a first field across electrode assemblies 25a and 25b by application of a high voltage on one electrode with the other electrode being maintained at a lower potential. A second field may be generated across electrode assemblies 25c and 25d by application of a high voltage on one electrode with the other electrode being maintained at a lower potential. The voltages may be applied to the selected electrode assemblies either simultaneously or sequentially. The deflection of the exhaust plume and the resulting thrust vector are controlled by regulating the magnitude and duration of the voltages applied to the electrodes. This permits the operator to steer the vehicle to a desired course. The voltage applied across the electrode assemblies may be of such a strength that the field breaks down, either partially or totally, and a flow of electrons from the high potential electrode to the low potential electrode is also generated across the stream of the exhaust plume.

According to another aspect of the invention, the same voltage potential can be applied to all electrode assemblies, i.e. 25a, 25b, 25c, 25d, creating a field that narrows the diameter of the exhaust flow as it exits the nozzle. This causes an increase in the velocity of the thrust stream and accelerates the vehicle. Prior to the present invention, the thrust stream exiting from a jet airplane engine nozzle was constricted during takeoff by mechanical actuation of a plurality of "turkey feathers" to provide additional acceleration. The method of the present invention has an advantage over "turkey feathers" in that it contains no moving parts.

According to yet a further aspect of the invention, a vortex is created in the exhaust stream by sequentially firing the electrode assemblies, i.e. 25a, 25b, 25c and 25d. The vortex may be used to provide heating or cooling to the vehicle.

Figure 7:
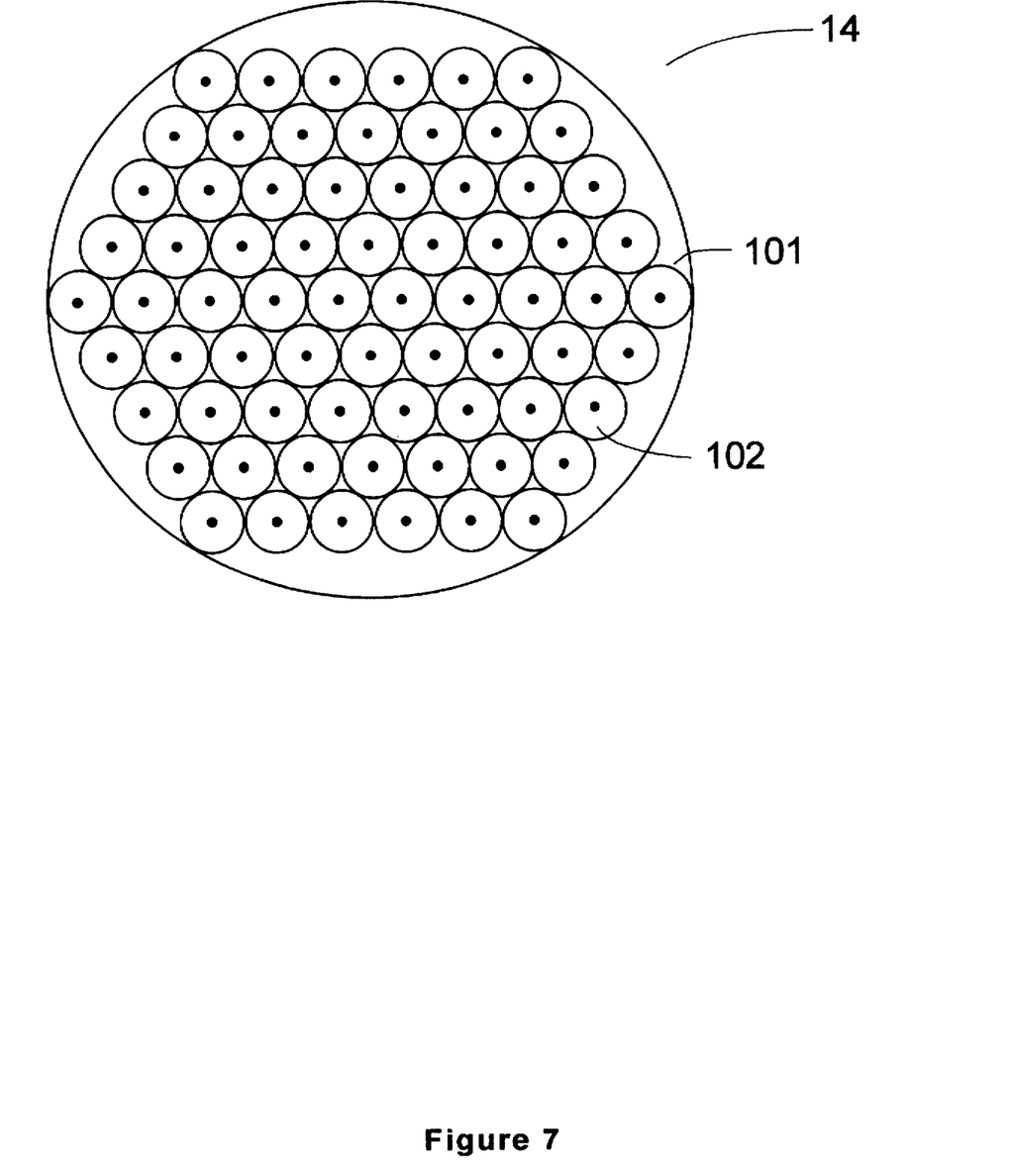
FIG. 7 is an enlarged end view of an electrode assembly according to an embodiment of the invention.
Figure 8:
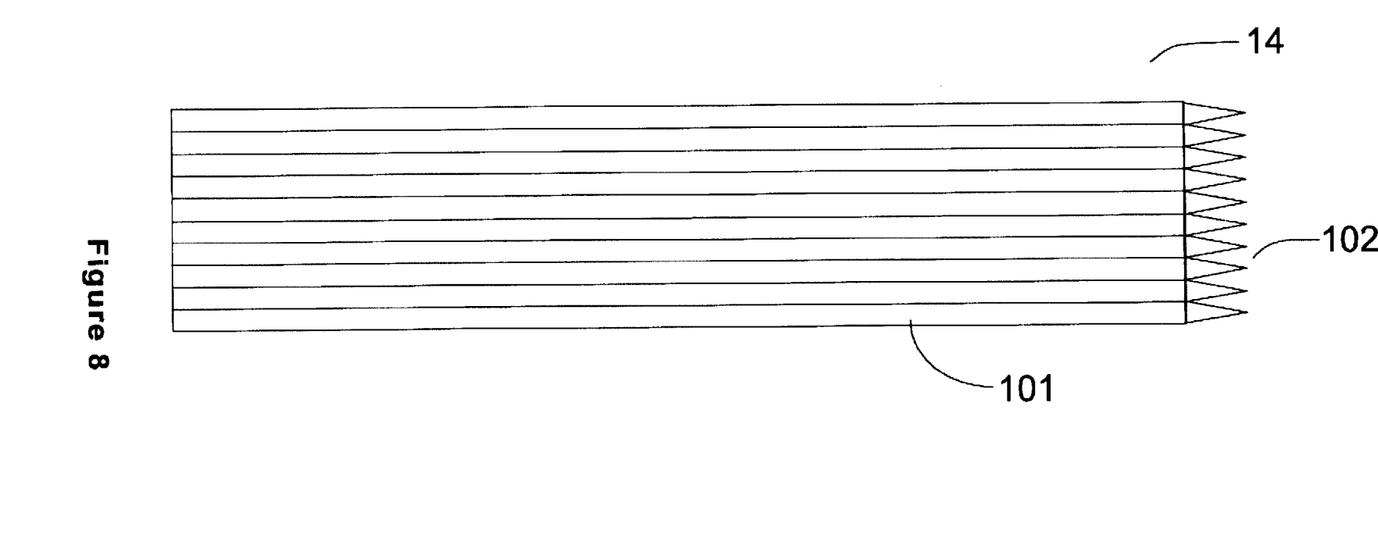
FIG. 8 is an enlarged side view of the electrode assembly shown in FIG. 7.

FIGS. 7 & 8 show a presently preferred embodiment of an electrode 14 according to the invention. Each electrode 14 comprises a bundle of needle-like objects 101, each having a first end physically and electrically connected to the electrode housing 22 and a second end aimed at the exhaust plume and exhibiting a point 102. The needle-like objects 101 are preferably gathered together in an electrically conductive bundle. Such an electrode assembly allows the thrust to be vectored without creating additional turbulence in the exhaust. The preferred array of needle like or pointed electrodes bundled closely together is specifically designed to eliminate turbulence and detrimental effects created by the electric field, and thus provide a smooth and effective mechanism for controlling thrust. Greater numbers of needle-like objects 101 utilized in the electrode assembly correlate to less turbulence created during the vectoring of the thrust. Each electrode 14 may comprise any number of bundled individual needle-like objects 101. According to one embodiment, between 100 and 200 needle-like objects 101 are bundled together in each electrode 14. The number of needle-like objects 101 will, of course, vary depending upon the size of the engines used.

Figure 9:
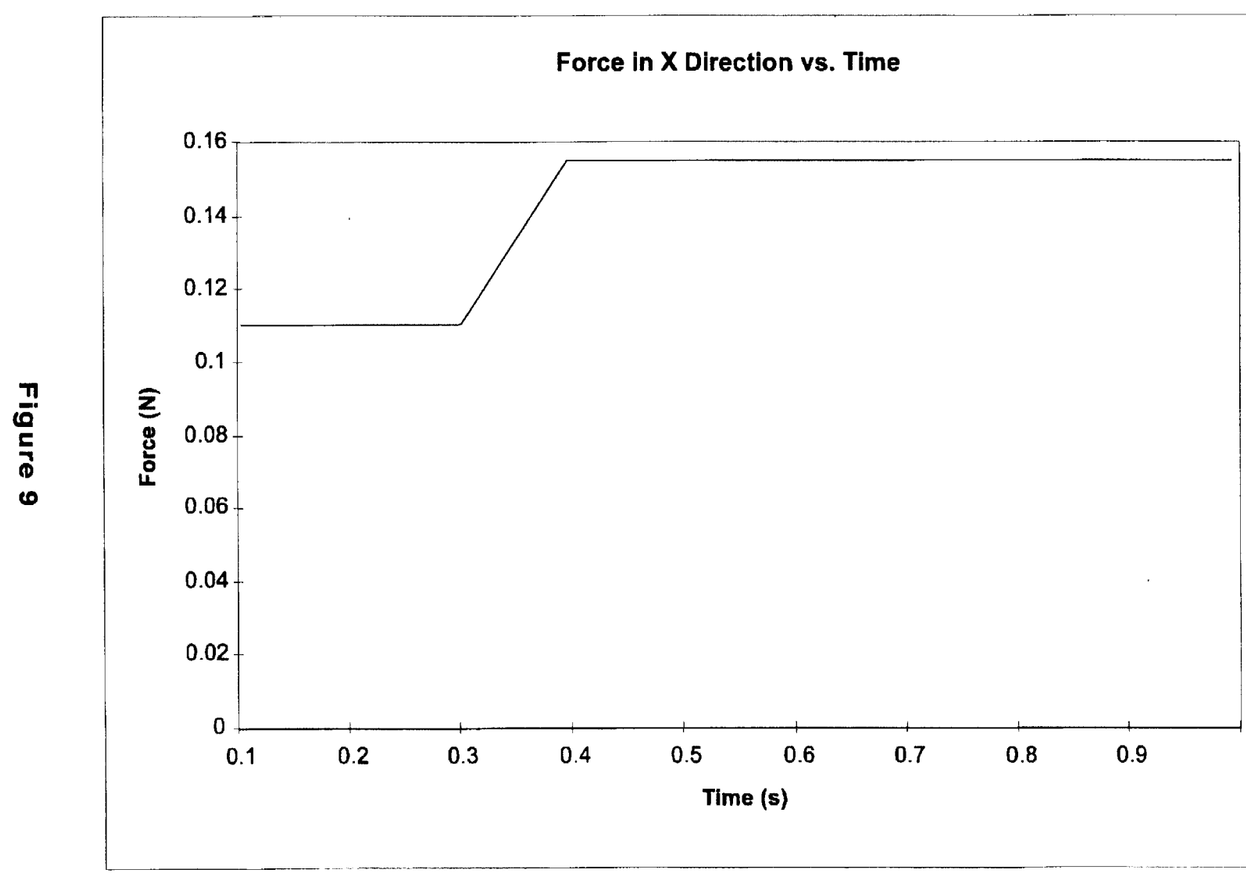
FIG. 9 is a graph showing the force applied to the exhaust plume in the X direction as a function of time according to an embodiment of the invention.
Figure 10:
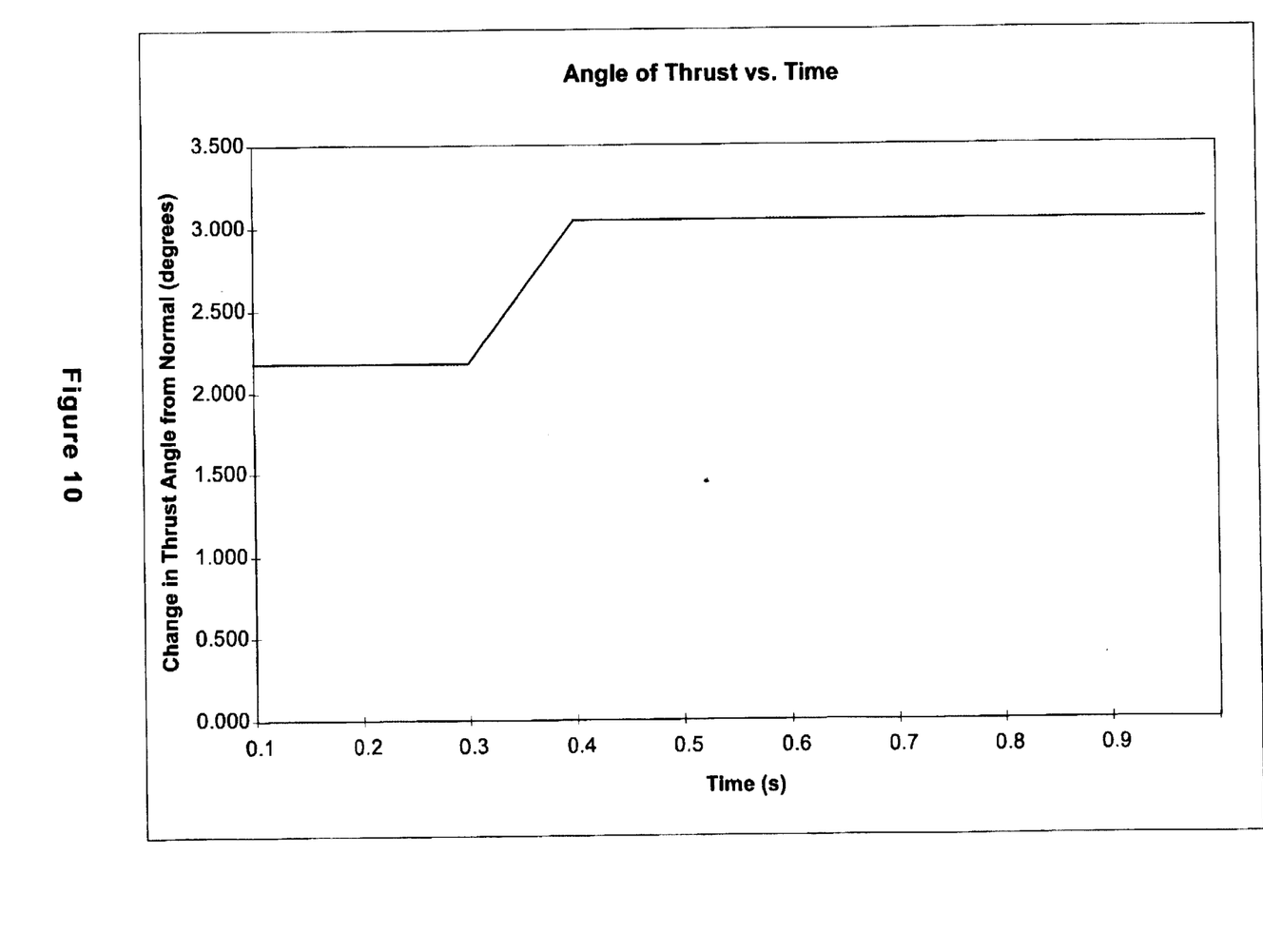
FIG. 10 is a graph showing the change in the thrust angle from normal, measured in degrees, of the exhaust plume as a function of time according to an embodiment of the invention.

FIGS. 9–12 graphically depict the results of tests performed on one preferred embodiment of the invention. The experiment was conducted by applying a 30,000 volt potential between an electrode comprising a plurality of bundled needle-like objects and a flat plate electrode. Said electrodes were positioned on opposing sides of the exhaust stream and a field was generated between the bundled needle electrode and the flat plate electrode. The data presented in FIGS. 9–12 was collected using a force transducer which monitored the amount of force in said X direction and produced an output signal proportional to the same which was monitored and recorded by an analog storage oscilloscope. As shown in FIGS. 9–10. The test was initiated at the time (t) equal to 0.1 seconds (s). From t=0.1 to t=0.3, there is no voltage being applied between any of the electrodes. At t>0.3, a 30,000 volt potential is applied by the high voltage generator to the bundled needle electrode and a field is generated between the opposing electrodes.

FIG. 9 shows the force produced by the exiting thrust stream of the test engine in the X direction as a function of time. The field causes the force in said X direction to increase from approximately 0.11 Newtons (N) to approximately 0.155 Newtons (N) at rate proportional to the slope of the line between the points (0.3, 0.11) and (0.4, 0.155). FIG. 10 shows the amount of time required to change the angle of the exiting exhaust and the thrust vector produced by the same in the X direction. The value of the force for t<0.3 (approximately 0.11 N) is not force that the test engine is producing in said X direction, rather it is simply a bias on the force transducer to allow more accurate measurement of the force produced by the invention in said X direction. FIG. 9 illustrates that the invention can quickly change the direction of the exiting exhaust and the thrust produced by the same in the X-Y plane. FIG. 10 illustrates that the angle of said exiting exhaust and the thrust vector produced by the same are also controlled by the invention in a quick manner.

Figure 11:
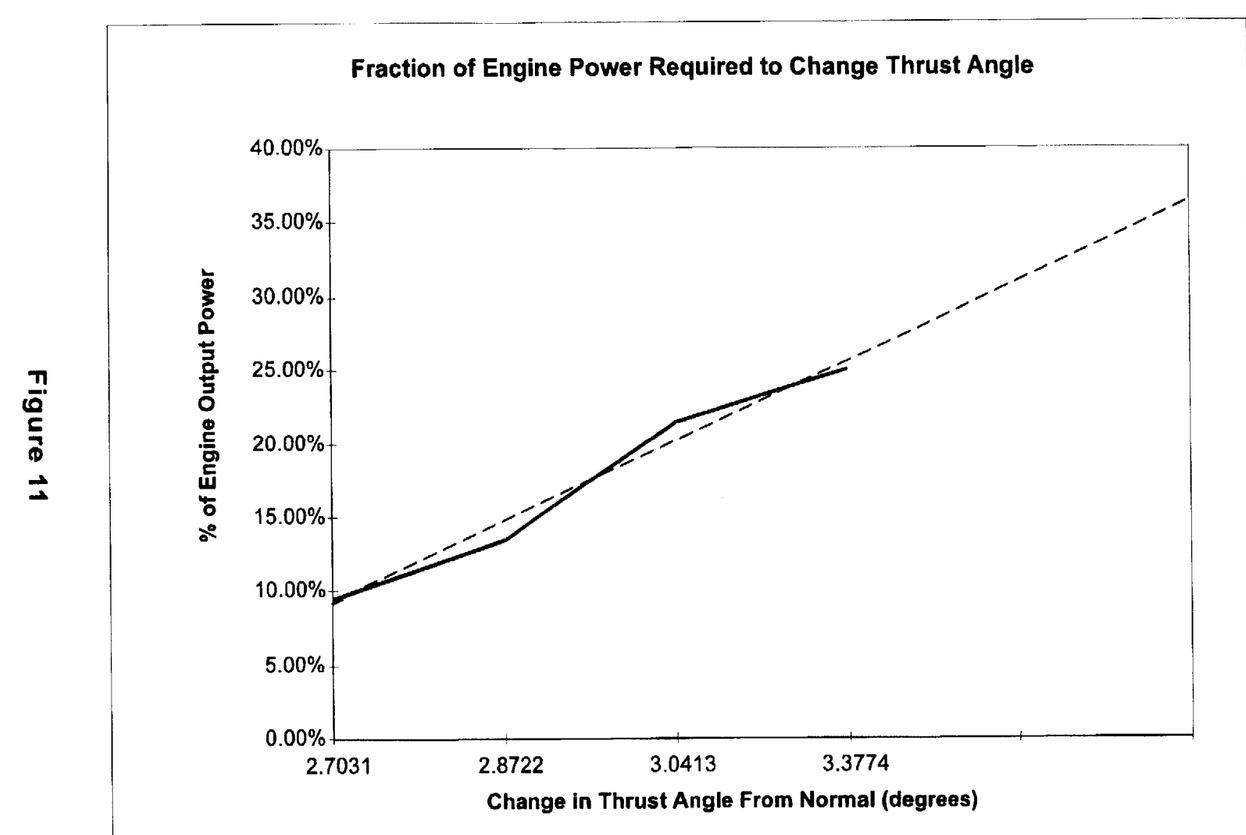
FIG. 11 is a graph showing the percentage of engine output power required to produce a corresponding change in the thrust angle, measured in degrees, according to an embodiment of the invention.

FIG. 11 compares the percentage of the output power from the test engine required to produce a change in the angle of the exiting exhaust and the thrust vector produced by the same. The percentage of engine output power was calculated by dividing measured quantities of power consumed by the high voltage generator and given values for the power output of the engine. The power consumed by said high voltage generator was calculated by measuring the current and voltage input to said high voltage generator, and using these experimental values to compute the input power with the formula P=IV, where power (P) is equal to the voltage (V) multiplied by the current (I). FIG. 11 indicates that said thrust can be vectored by 3 degrees by using an input power to said high voltage generator equivalent to 23% of the engine's output power. Although not shown in the drawings, the efficiency of the invention has been improved to allow a 6.2 degree vector of said exhaust and accompanying thrust to be achieved using an input power to said high voltage generator equivalent to 20% of the engine's output power. Further refinements mentioned herein will result in even better efficiencies being achieved.

Figure 12:
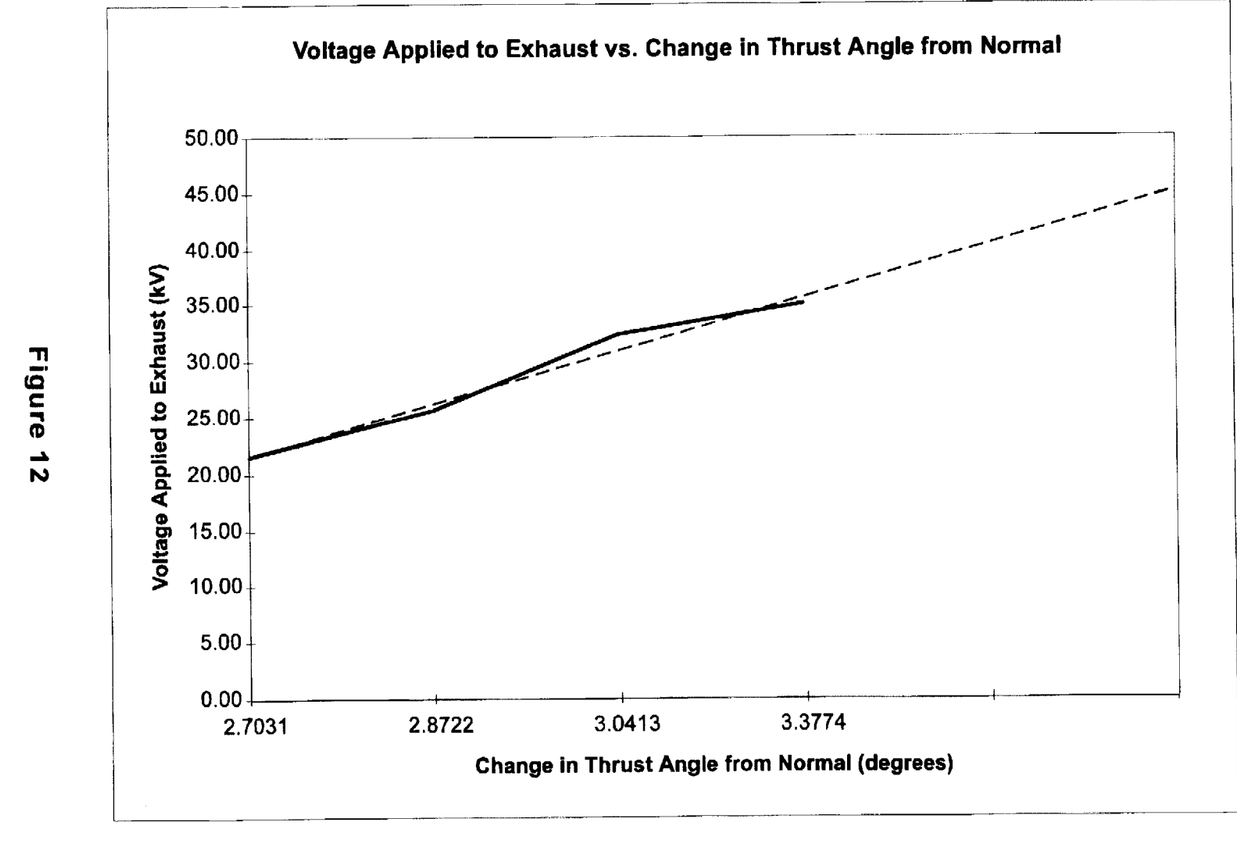
FIG. 12 is a graph showing the voltage applied to the exhaust required to produce a corresponding change in the thrust angle according to an embodiment of the invention.

FIG. 12 shows the amount of voltage applied to said electrodes required to change the vector of said thrust by a given angle. The voltage applied to said electrodes was computed by measuring the input voltage to said high voltage generator and multiplying these voltage values by the constant of said high voltage generator. The voltage multiplying constant of said high voltage generator was found by providing different input voltages to said high voltage generator and measuring the corresponding output voltages with a voltage reducing resistor network. The voltage values appearing in FIG. 12 were measured in real time with the change in said thrust angle. The voltage values, however, were computed from the input voltage and not measured directly at said electrode assemblies to avoid interference of measuring equipment with the performance of the invention. FIG. 12 shows that 30,000 volts must be applied across said electrodes to vector said thrust 3 degrees. Although not shown in the drawings, the efficiency of the invention has been improved to allow for a 6.2 degree vector to be achieved by applying only 32,000 volts to said electrodes. Greater efficiencies may be realized upon further refinements to the invention.

The results shown in FIGS. 9–12 indicate that the response time of the invention is quick compared to current methods of thrust vectoring, which are slowed down by moving parts, and also indicate that both the angle of the thrust exiting the vehicle and the force vector of the thrust change simultaneously in time. These results are scaleable, and indicate that the present invention is more efficient than current methods of thrust vectoring, which require up to 45% of the engine output power to achieve a thrust vector of 4 degrees, providing superior performance over prior art because the invention is faster, lighter, simpler, and less expensive to maintain.

The present invention, therefore, is well adapted to carry out the objects and attain the ends and advantages mentioned as well as others inherent therein. While presently preferred embodiments of the invention are given for the purpose of disclosure, numerous changes in the details will readily suggest themselves to those skilled in the art and which are encompassed within the spirit of the invention and the scope of the appended claims.

I claim:

1. An apparatus for modifying a stream of an exhaust plume ejected from a vehicle through an exhaust nozzle defining an exit, comprising:

a first pair of diametrically opposed electrodes positioned around the periphery of the exit of the exhaust nozzle and having a plurality of points for generating a voltage differential across the stream of the exhaust plume, the exhaust plume having charged ions and particles and a natural dielectric breakdown voltage, the voltage differential across the stream of the exhaust plume being greater than the natural dielectric breakdown voltage thereby creating a flow of electrons across the stream of the exhaust plume originating from the electrode points for interacting with the charged ions and particles; and means for controlling the magnitude and extent of deflection of said exhaust plume to steer the vehicle to a desired course.

2. The apparatus according to claim 1, further comprising at least a second pair of electrodes being diametrically offset from the first pair of electrodes.

3. The apparatus according to claim 2, wherein the second pair of electrodes is offset 90 degrees from the first pair of electrodes.

4. The apparatus according to claim 1, further comprising an electrode housing exhibiting an inner surface to which the first pair of electrodes are connected.

5. The apparatus according to claim 4, wherein said electrode housing comprises a plurality of electrically conductive arc-shaped segments, each arc-shaped segment being electrically isolated from adjacent segments, and each segment carrying an electrode from the first pair of electrodes.

6. The apparatus of claim 1, wherein the voltage differential is between 15 kV and 40 kV.

7. The apparatus of claim 1, wherein the electrodes comprise a plurality of needle-like objects gathered together in an electrically conductive bundle.

8. A method for modifying a stream of an exhaust plume ejected from a vehicle through an exhaust nozzle defining an exit, comprising:

generating a field with a voltage differential applied between electrodes placed about the periphery of the exit of the exhaust nozzle and across the exhaust plume, said exhaust plume having a natural dielectric breakdown voltage, and the electrodes having a plurality of points;

generating a flow of electrons from the points of the electrodes by increasing the voltage differential above the natural dielectric breakdown voltage of the stream of the exhaust plume; and controlling the magnitude and extent of deflection of the stream of the exhaust plume to steer the vehicle to a desired course.

9. The method of claim 8 wherein said step for generating a field comprises generating a plurality of diametrically offset fields, and said step for generating a flow of electrons comprises generating a plurality of diametrically offset flow of electrons.

* * * * *